(12) United States Patent
Mueller et al.

(10) Patent No.: US 6,647,760 B2
(45) Date of Patent: Nov. 18, 2003

(54) VIBRATION PICKUP WITH PRESSURE SLEEVE

(75) Inventors: Wolfgang-Michael Mueller, Rutesheim (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 09/788,962

(22) Filed: Feb. 20, 2001

(65) Prior Publication Data
US 2001/0020384 A1 Sep. 13, 2001

(30) Foreign Application Priority Data
Feb. 26, 2000 (DE) .......................... 100 09 169

(51) Int. Cl.7 .............................. G01L 23/22
(52) U.S. Cl. ...................................... 73/35.11
(58) Field of Search .................... 73/35.11, 654, 73/702, 35.09; 310/329

(56) References Cited

U.S. PATENT DOCUMENTS 5,739,418 A * 4/1998 Hackel et al. ............. 73/35.11
6,220,078 B1 * 4/2001 Brammer et al. .......... 73/35.11

FOREIGN PATENT DOCUMENTS

| DE | 29 37 882 B2 | 7/1981 |
| DE | 44 03 660 A1 | 10/1994 |
| DE | 195 24 147 A1 | 1/1997 |

* cited by examiner

Primary Examiner—Hezron Williams
Assistant Examiner—Tamiko Bellamy
(74) Attorney, Agent, or Firm—Michael J. Striker

(57) ABSTRACT

A vibration pickup has a pressure sleeve which is placeable on a component causing vibrations, a sensor element which detects the vibration, a seismic mass which is placeable outside of the sleeve on a support surface of the sensor element with an axial pretensioning, so that the sensor element is held between the seismic mass and a flange-like segment of the pressure sleeve, the seismic mass and the pressure sleeve being formed as a one-piece integral component.

2 Claims, 1 Drawing Sheet

VIBRATION PICKUP WITH PRESSURE SLEEVE

BACKGROUND OF THE INVENTION

The present invention relates to a vibration pickup with a pressure sleeve.

Vibration pickups of the above mentioned general type are known in the art. One of such vibration pickups with a pressure sleeve is disclosed in the German patent document DE 44 03 660. It is formed as a knock sensor for monitoring the operation of an internal combustion engine of a motor vehicle. The pressure sleeve is placed through an abutment region firmly on a component which causes a vibration, here a motor block of the internal combustion engine.

The vibrations to be detected in the known arrangement are represented by knocking noise of the internal combustion engine during the operation. They are transmitted through the pressure sleeve in a piezo-ceramic disc as a sensor element, with the intermediately located contact discs and insulating discs. It allows a signal pickup, and thereby an evaluatable electric output signal is produced. The type of mounting or clamping of the sensor arrangement on the pressure sleeve and the mounting of the vibration pickup on the component to be vibrated has a great influence both on the manufacture procedure as well as on eventual correct or faulty measurements and disturbances in the operation. The clamping of the sensor element together with a plurality of individual components, for example with a spring and a seismic mass, is performed in the known vibration pickup for example by a threaded ring which is screwable on a corresponding thread of the pressure sleeve.

Another German document DE 195 24 147 discloses a vibration pickup of the above mentioned general type in which the threaded ring and the spring as a so-called spring head nut are formed as a single one-piece component. This spring head nut is then screwable on the thread of the pressure sleeve and abuts directly against the seismic mass.

SUMMARY OF THE INVENTION

Accordingly, it is an object of present invention to provide a vibration pickup of the above mentioned general type which is a further improvement of the existing vibration pickups.

In keeping with these objects and with others which will become apparent hereinafter, one feature of present invention resides, briefly stated, in a vibration pickup with a pressure sleeve which has to be arranged on a component causing the vibrations and a sensor element which detects the vibrations, wherein in accordance with the present invention the seismic mass and the pressure sleeve together form a one-piece integral component.

The seismic mass is located outside the pressure sleeve under an actual pretensioning on an abutment surface of the sensor element and thereby the sensor element is held between the seismic mass and a flange-shaped segment of the pressure sleeve. This provides, because of the one-piece integral arrangement, a simplification of the total construction of the vibration pickup a with reduced number of the components.

With the one-piece integral construction, the seismic mass in a simple manner is connected with the pressure sleeve through a web which is flexible within predetermined limits. Therefore between the seismic mass and the flange-shaped projection a ring gap is formed. Before mounting of the sensor element, it must have a substantially smaller axial opening than the axial width of the sensor element.

For providing a simple mounting of the sensor element, the sensor element is axially slotted on one side, so that during the mounting of the vibration pickup it is placeable around the periphery on the pressure sleeve in the ring gap. Thereby during the mounting of the sensor element and the pressure sleeve, the seismic mass is pressed back in an axial direction from the flange-shaped projection, so that the sensor element passes in the thusly increased ring gap. After the mounting, the sensor element is held with the required pretensioning on the flange-shaped projection.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
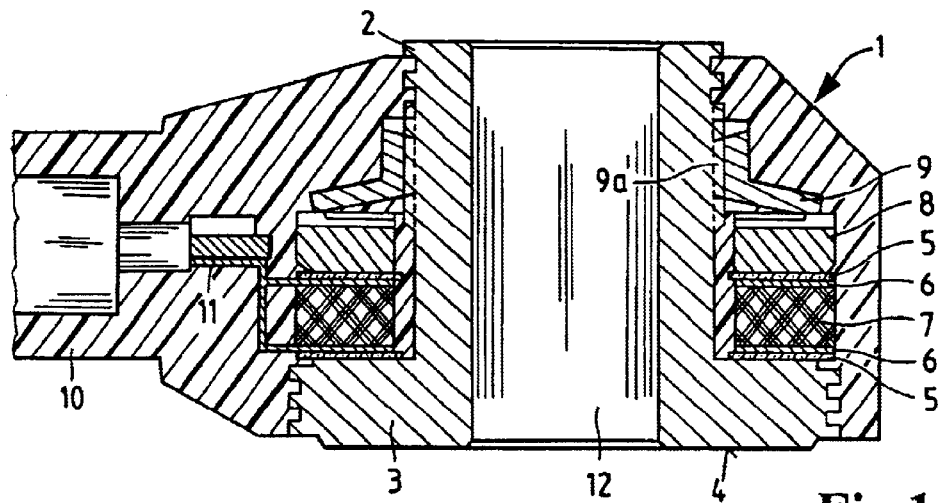
FIG. 1 is a view showing a section of a knock sensor housing of a vibration pickup in accordance with the present invention.

A vibration pickup which is formed as a knock sensor and designed in accordance with the present invention is shown in FIG. 1. It is used for an internal combustion engine having an outer synthetic plastic housing 1, in which the pressure sleeve 2 is arranged. The pressure sleeve 2 in the region of the its lower end has a flange-shaped portion 3. It is placed with the portion 3, and in particular with its base surface 4 on a not shown motor block, whose vibrations are to be detected.

On the outer periphery of the pressure sleeve 2, several elements are provided starting from a lower supporting surface on the flange-shaped portion 3. These elements include an insulating disc 5, a first contact disc 6, a piezo-ceramic disc 7 which is a sensor member in the sensor element, and then a second contact disc 6, as well as a second insulating disc 5. A seismic mass 8 is placed on this arrangement. A plate spring 9 is arranged over the seismic mass 8. It is provided with an inner thread 9 and screwed in direction of the piezo-ceramic disc 7 on the pressure sleeve 2.

The vibration pickup further has an integrated connection part 10 which accommodates the housing 1 and is composed of synthetic plastic produced by injection molding. The connection part 10 is provided with electrical connections 11 for the contact disc 6. The connections 11 are connected with both contact discs 7, so that an electrical connection at both sides of the piezo-ceramic disc 7 is produced through both contact discs 6, and the electrical voltage is produced in an axial direction during the pressure loading of the piezo-ceramic disc 7.

The pressure sleeve 10 has a central recess, for example a bore 12. A not shown mounting screw extends through the bore 12 and mounts the knock sensor directly or indirectly on a motor block of an internal combustion engine. During mounting of the block sensor the whole torque applied from the above described mounting screw is transmitted to the pressure sleeve 2 through the lower surface 2. In other words, no force acts during mounting on the piezo-ceramic disc 7 as a sensor member.

A pretensioning force is produced by the pressure of the screwed-on seismic mass 9. The pretensioning forces is selected so that axial forces act on the piezo-ceramic disc 7 directly, without worsening of the electrical signals, and they are independent from the thermal expansions as well as unavoidable straining of the pressure sleeve 2 during the mounting.

The pulses which are applied from the seismic mass 8 proportionally to the vibrations of the internal combustion engine are converted in the piezo-ceramic disc 7 into signals which are evaluatable in a corresponding device.

Figure 2:
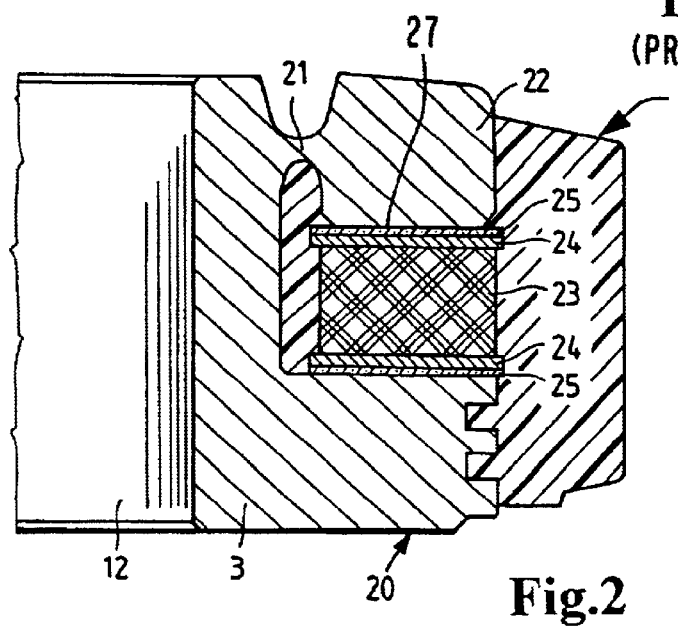
FIG. 2 is a view showing a partial section of the vibration pickup with the inventive construction of the seismic mass which is formed of one piece with the pressure sleeve.

FIG. 2 illustrates the inventive construction of a one-piece integral component 20 with a pressure sleeve. It is connected through a web 21 with a seismic mass 22. A sensor element is formed as a slotted piezo-ceramic disc 23 and is inserted with the contact discs 24 and the insulating discs 25 into the ring gap 27 between the seismic mass 22 and the flange-shaped projection 3.

Figure 3:
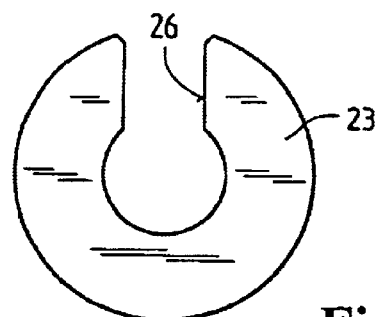
FIG. 3 is a view showing a detail of the sensor element of the inventive vibration pickup.

The piezo-ceramic disc 23 is shown in detail with the slot 26 in FIG. 3. For mounting of the sensor element, it can be placed by means of the slot 26 during the mounting of the vibration pickup around the periphery of the pressure sleeve 2 in the ring gap. During the mounting of the sensor element or the piezo-ceramic disc 23, the seismic mass 22 is pressed back in an axial direction from the flange-shaped projection 3. Therefore the sensor element passes in the thusly increased ring gap 27.

After the mounting the piezo-ceramic disc 23 is held with a required pretensioning on the flange-shaped projection 3 by the seismic mass 22.

It will be understood that each of the elements described above, or two or more together, may also find a useful application in other types of constructions differing from the types described above.

While the invention has been illustrated and described as embodied in vibration pickup with pressure sleeve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vibration pickup, comprising a pressure sleeve which is placeable on a component causing vibrations; a sensor element which detects the vibration: a seismic mass which is placeable outside of said sleeve on a support surface of said sensor element with an axial pretensioning, so that said sensor element is held between said seismic mass and a flange-shaped projection of said pressure sleeve, said seismic mass and said pressure sleeve being formed as a one-piece integral component, wherein in said integral component said seismic mass with said pressure sleeve through a web which is flexible within predetermined limits, so that between said seismic mass and said flange-shaped projection a ring gap is formed, which prior to mounting of said sensor element has a smaller axial opening than an axial width of said sensor element, said sensor element being axially slotted on one side, so that during mounting of the vibration-pickup said sensor element is placed around a periphery of said pressure sleeve in said ring gap.

2. A vibration pickup as defined in claim 1, wherein sensor element, said pressure sleeve and said seismic mass are formed so that during mounting of said sensor element and said pressure sleeve said seismic mass is pressed back in an axial direction from said flange-shaped projection, and thereby said sensor element is passed through an increased ring gap and after the mounting said sensor element is held with a required pretensioning of said flange-shaped projection.

* * * * *